Feb. 2, 1932. E. G. ROMEISER 1,843,836
ELECTRIC WIRE CONDUIT
Filed March 2, 1931
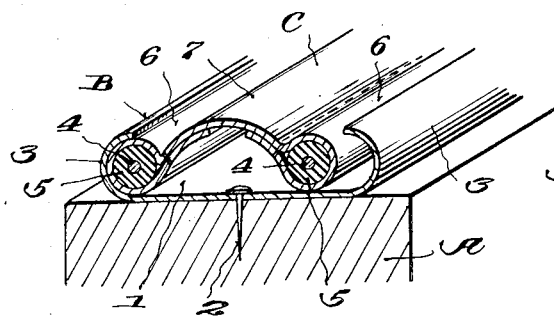
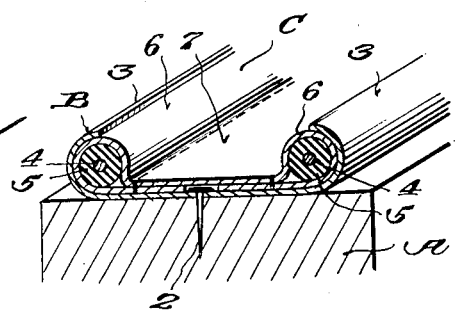
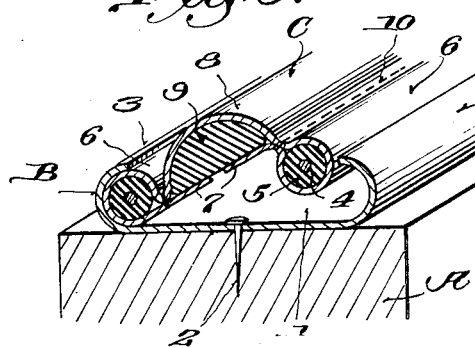
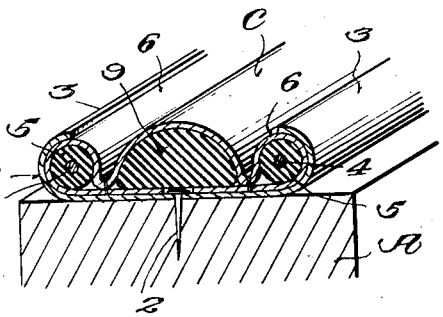
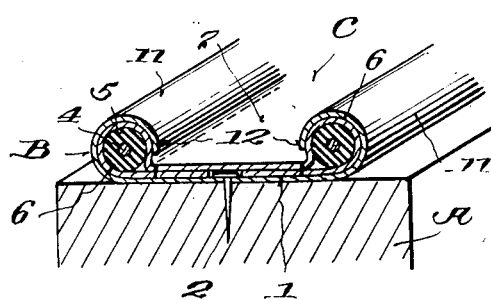
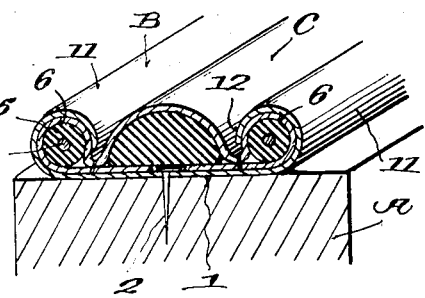
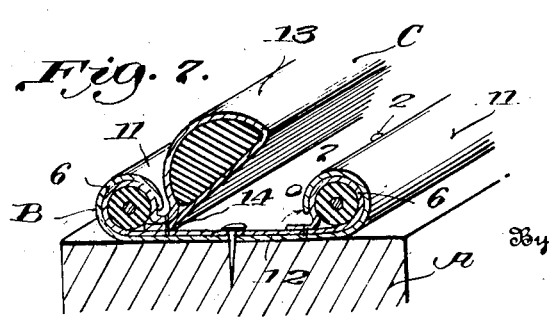
Inventor
Ernest G. Romeiser
By Dype & Kirchner
Attorney Patented Feb. 2, 1932

1,843,836

UNITED STATES PATENT OFFICE

ERNEST G. ROMEISER, OF UNION CITY, INDIANA

ELECTRIC WIRE CONDUIT

Application filed March 2, 1931. Serial No. 519,664.

My invention relates to electric wire conduits, and particularly to insulated electric current conductors adapted to be used in interior installations.

A particular type of conduit to which my present invention is especially adapted comprises an electric conducting wire or a plurality of such wires, each provided with an insulating covering and an area adapted to receive tacks or similar fastening means for securing the conduit to a support. The wire coverings are generally formed of paper, textile fabric or similar material with jackets of rubber or its compounds immediately surrounding the wires themselves. The supports to which these conduits are frequently secured are commonly the interior walls, floors and ceilings of rooms and the like in dwelling houses and other buildings, and when a run of the conduit is installed in the lower zone of an interior, as for example along the baseboard, wainscoting, or lower part of the wall of a room, the conduit becomes subject to injury from accidental blows by the feet of persons, the legs of chairs and other articles of furniture, vacuum cleaners and other floor cleaning instrumentalities, and from a variety of other causes.

It will be appreciated that the appearance of a conduit used in interior installations is important, and that injuries thereto are objectionable insofar as the resulting defacement of the covering material detracts from the neat and attractive appearance originally presented by the conduit. It is an object of the present invention to provide a conduit of the type indicated with means for preventing such injuries.

In addition to the impaired appearance of the conduit, the causes suggested hereinabove frequently operate to bring about functional defects in the conduit by removing a portion of the wire insulation and exposing the wires. Serious damage has been caused by short circuits resulting from wires so exposed. A further primary object of the present invention is to provide a conduit having means to prevent such injuries.

To accomplish the foregoing and other objects and advantages which will be more apparent as the description proceeds, my invention contemplates providing the conduit with a resistant sheath or covering, preferably of metal, for the current carrying wires and their insulating jackets. An especial feature of the invention resides in the ease and facility with which the sheath and the body carrying the wires with their insulating jackets may be associated and together mounted on the supporting wall, floor or the like.

In a particular and preferred form of embodiment the present invention contemplates a metallic channel having upwardly and inwardly bent longitudinal margins adapted to receive wire-containing edge beads formed on a conduit body, as will be described in more detail hereinafter.

In the accompanying drawings which form part of this application for Letters Patent and in which the same reference character is used to designate the same part in the several views, The several figures are perspective views with one end in section, of a support and various types of electric wire conduits and protective sheaths, as proposed by the present invention.

Referring now to the drawings, in each of the figures the reference character A designates any suitable support such as a portion of a wall, floor, baseboard or the like. In each of the figures the reference character B designates generally a metallic protective sheath for a wire-containing body C.

Figs. 1 and 2 illustrate a preferred embodiment of the invention, which comprises a protective sheath B preferably formed of metal and including a center portion 1 through which a series of tacks or the like 2 may be passed to secure the sheath to the support A. The longitudinal margins 3 of the sheath are curved upwardly and inwardly to receive the wire-containing bead portions of the conduit body which will now be described.

The body C may conveniently be formed of any suitable fabric such as paper, leather, textile material or the like, folded upon itself and enclosing at its opposite longitudinal edges electric conductor wires 4. Each wire 4 is encased in an insulating jacket 5 of rubber or equivalent composition; and each wire and its jacket produce an enlargement which forms a distinct bead 6 along each of the longitudinal edges of the body.

The beads 6, 6, of the body are conveniently made substantially tubular in contour, and the margins 3, 3, of the metallic sheath are in such case made parti-cylindrical so as snugly to receive the beads of the body, as shown in Fig. 2. To this end, the distance between the centers of curvature of the two marginal portions 3, 3, is equal to the distance between the wires 4, 4, of the body when the intervening web 7 of the body is extended in flat condition, as shown in Fig. 2. These proportions result in snug engagement of the beads 6 in the curved margins 3 when the parts B and C are associated in the operative relation shown in Fig. 2. It will be evident that the assembly of the parts may be readily accomplished by first tacking the sheath to the support, then flexing the intermediate web 7 to draw the beads 3 toward each other, then inserting the beads into the curved margins 3, and finally depressing the intermediate portion 7 of the body to collapse the same against the center portion 1 of the sheath.

Figs. 3 and 4 illustrate a modification of the invention, in which the intermediate portion 7 of the body is provided with a relatively large bead 8, formed by a solid filler 9 carried on the area of the body between the wire-containing beads. As in the case of the form of the invention shown in Figs. 1 and 2, the modification of Figs. 3 and 4 contains electric conducting wires 4 encased in insulating jackets 5 which together form edge beads 6 along the longitudinal edges of the body. Association of the body with the sheath in the case of Figs. 3 and 4 is accomplished by flexing the ends of both of the edge beads 6 along the hinge connection 10 formed at the union of each of the beads with the intermediate portion 7 of the body.

The margins 3, 3, of the metallic protective sheath B of Figs. 1 to 4 inclusive are each substantially semicircular in cross section, so that the edge beads 6, 6, of the body may be inserted in the margins without distortion or deformation of either the margins or the beads.

Figs. 5 to 7 inclusive illustrate a conduit assembly in which the margins 11 of the sheath B are more than semicircular in cross section so that the beads 6 of the body C are inserted into the margins by deforming or distorting temporarily the resilient metal of the sheath margins. It will be evident that the margins 11 thus provided each terminate in an edge 12 which is spaced from the intermediate area of the sheath a distance which is less than the diameter of the wire-containing beads. While the body and sheath of the embodiment of the invention shown in Figs. 5 to 7 inclusive are not as easily assembled as the types shown in Figs. 1 to 4 inclusive, it will be evident that the added length of the margins 11 results in a superior protection to the wire-containing beads which they enclose.

The body of Fig. 7 is provided with a central bead 13 which is hinged along a line of stitching 14 to one of the beads 6, to provide a blind nail structure. As shown in Fig. 7 the body and sheath may be first assembled and then together tacked to the support A by lifting bead 13, which may, after the tacking operation be depressed to cover and conceal the tack heads.

It will be evident that the several embodiments of the invention which have been described, as well as others which will readily suggest themselves to persons skilled in the art, provide a wire-containing conduit having an efficient sheath to protect the wires and their insulating coverings from mutilation, defacement and possible short circuiting.

It is to be understood that I have shown and described the present invention in certain preferred forms of embodiment only merely for purposes of exemplification. The invention may be embodied in other and different forms, but all such modifications, to the extent that they embody the principles of the invention as pointed out in the appended claims, are to be deemed within the scope and purview thereof.

Having thus described my present invention what I claim and desire to secure by Letters Patent is:

1. An electric wire conduit including a metallic sheath having an intermediate area adapted to be tacked to a support and having upwardly and inwardly curved outer margins, in combination with a body having a center portion adapted to engage the intermediate area of the sheath and having wire-containing edge beads adapted to be snugly contained within the curved margins of the sheath, at least one of the beads being hingedly connected to the center portion of the body whereby said bead may be rocked toward the other bead to permit the sheath and the body to be joined in operative relation.

2. An electric wire conduit including a metallic sheath having an intermediate area adapted to be tacked to a support and having upwardly and inwardly curved outer margins, in combination with a body having a center portion adapted to engage the intermediate area of the sheath and having wire-containing edge beads adapted to be snugly contained within the curved margins of the sheath, each of said beads being united to the center portion of the body by a hinge connection whereby the beads may be rocked inwardly of the body to permit the beads to be inserted in the curved margins of the sheath.

3. The combination claimed in claim 2, in which the body is provided with a relatively large bead in the area between the wire-containing beads adapted when engaged with the intermediate area of the sheath to urge the wire-containing beads into the curved margins of the sheath.

4. The combination claimed in claim 2, in which the wire-containing beads are substantially cylindrical, and in which the inner edges of the curved margins of the metallic sheath are spaced from the intermediate area of the sheath a distance less than the diameter of the wire-containing beads, the margins of the sheath being resilient and deformable to admit the wire-containing beads.

5. The combination claimed in claim 2, in which the wire-containing beads are substantially cylindrical, and in which the inner edges of the curved margins of the metallic sheath are spaced from the intermediate area of the sheath a distance substantially equal to the diameter of the wire-containing beads, whereby the beads may be inserted in the sheath margins without deformation of the margins.

In testimony whereof I affix my signature.

ERNEST G. ROMEISER.